Feb. 27, 1973   W. D. MILLER   3,718,098
ELASTIC POST BRACING ASSEMBLY
Filed Aug. 28, 1970   2 Sheets-Sheet 1

William Don Miller
INVENTOR
BY
Atty.

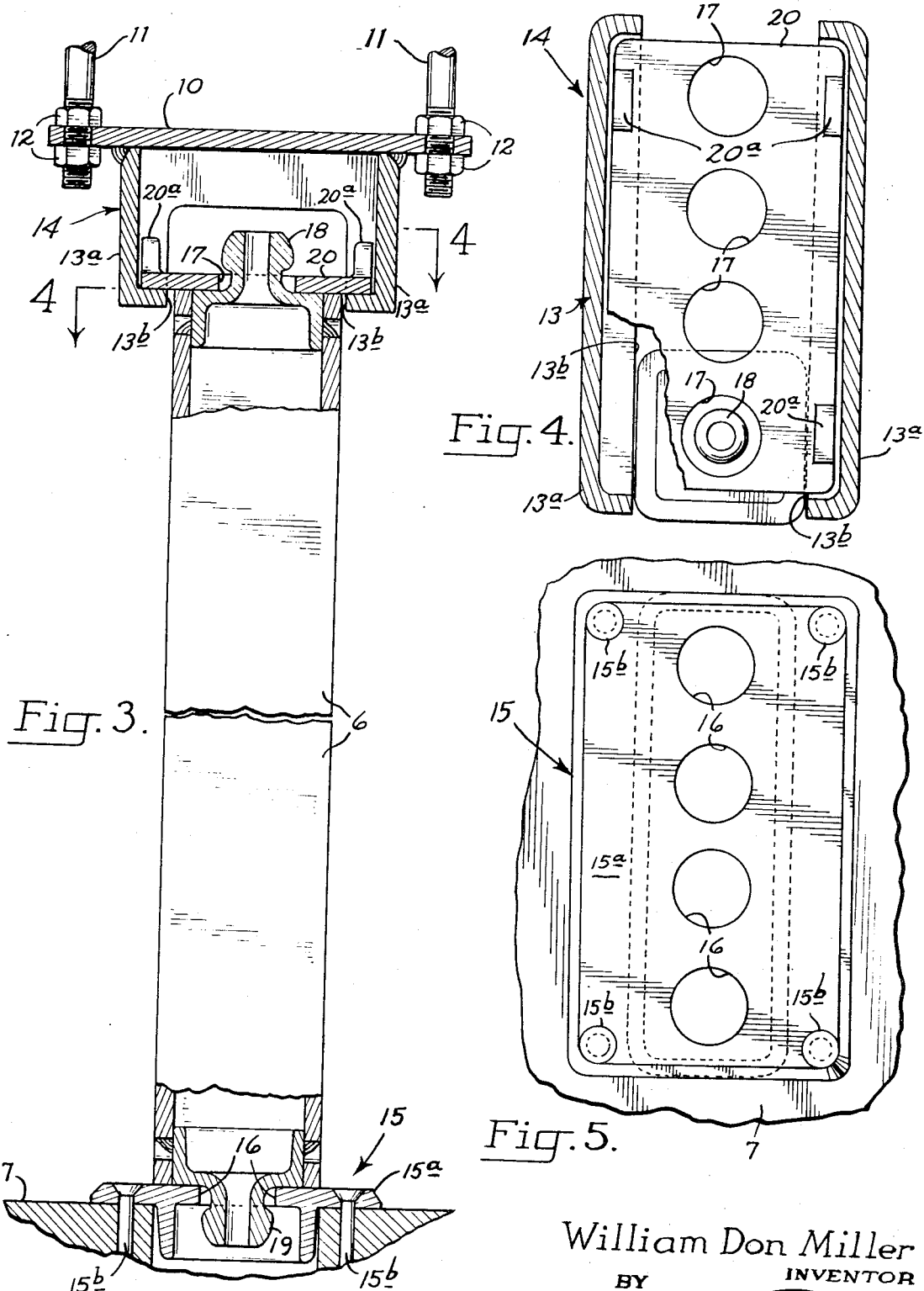

United States Patent Office 3,718,098
Patented Feb. 27, 1973

3,718,098
ELASTIC POST BRACING ASSEMBLY
William Don Miller, 5505 E. Evergreen Blvd.,
Vancouver, Wash. 98661
Filed Aug. 28, 1970, Ser. No. 67,775
Int. Cl. B61d 45/00; B60p 7/10
U.S. Cl. 105—369 B                    5 Claims

ABSTRACT OF THE DISCLOSURE

Bracing posts for railway boxcars engage adjacent, detached items of cargo, usually packaged, to prevent lateral displacement thereof. If a post engages one side of a rigid package of cargo and pins it against the side of the car, the package will tend to cant instead of slide longitudinally of a car under travel conditions inducing sway, acceleration and deceleration forces induced by motion. An elastic, tubular, vertical, non-circular post having substantial elasticity, fixed at its upper end, will twist about its longitudinal axis and will maintain face-to-face engagement with the cargo if it is journal-mounted at its lower end. This develops torque within the post to cam-lock the cargo against the side of a railway car, under bind or frictional engagement that will inhibit shifting even under the action of alternating opposed forces developed by such acceleration, deceleration, and sway of the car in motion. The grip developed by the twisted post maintains face-to-face engagement with the cargo, particularly if it is strapped cargo.

---

This invention relates to railway boxcar load bracing involving the use of spaced, vertical posts, and is an improvement on the structure illustrated and described in my U.S. Letters Patent No. 3,342,142, entitled Bracing for Railroad Boxcar, issued Sept. 19, 1967.

As is brought out in said patent, all bracing for boxcars with which I was familiar at that time attempted to block cargo from shifting under stress. Stress is developed as the railway car is pulled along a track, particularly at high speed. At that time, I though that better immobilization of cargon could be accomplished by loosely arranging vertical posts, one at the median line of each cargo item, thus to permit cargo to cant and pivot about a vertical axis until the units of cargo were cam-locked between a post and the side wall of a boxcar. Cargo is thus wedged before it can shift substantially and is locked into fixed traveling position. This type of post locking has proven successful under most conditions, but I have discovered that sometimes dislodging forces are exerted that tend to cant the load in periodic opposing directions of rotation. If these dislodging forces are severe or are periodically repeated, the cam-lock may be relaxed, then re-gripped, and the load may creep during such periods of relaxation produced by successive opposed forces applied thereto. These periods of relaxation are usually of short duration, but cumulatively are sufficient to relax the original cam-lock and will permit shift of the cargo.

I have determined that if non-circular tubular posts made of aluminum alloy, or other elastic material, are used, and each is held against twisting by a complementary non-circular socket at its upper end and is journaled at its lower end, that a load engaged by such a post will distort said post within its elastic limit to such a degree that opposed shifting forces will not completely loosen the grip of the post with its load. That is to say, I utilized the torque or bias developed, as a yielding source of power to inhibit relaxation of the original frictional grip of a load by its bracing posts. Said yieldable bias thus prevents physical disengagement of the load by a bracing post to prevent inadvertent creeping, even in the presence of rapidly changing periodically opposed forces, produced by vibration, for example.

Experience develops that rectangular posts, having four flat sides, function well and do not relax the flat face-to-face engagement of each post with its load.

Further details of my invention are hereinafter described in greater detail with relation to the accompanying drawings, in which:

FIG. 3 is an elevation of a post shown foreshortened and with parts shown broken away to disclose details of construction of the post, its upper and lower sockets and post mounts;

FIG. 4 is a horizontal, sectional view taken on the line 4—4 in FIG. 3 through the upper mount for a post, a part of said mount being shown broken away to indicate the degree of play between the mount and the post; and FIG. 5 is a plan view looking down upon the lower mount for a post lodged in the floor of a railway boxcar, with the post removed therefrom:

Figures 1, 2:
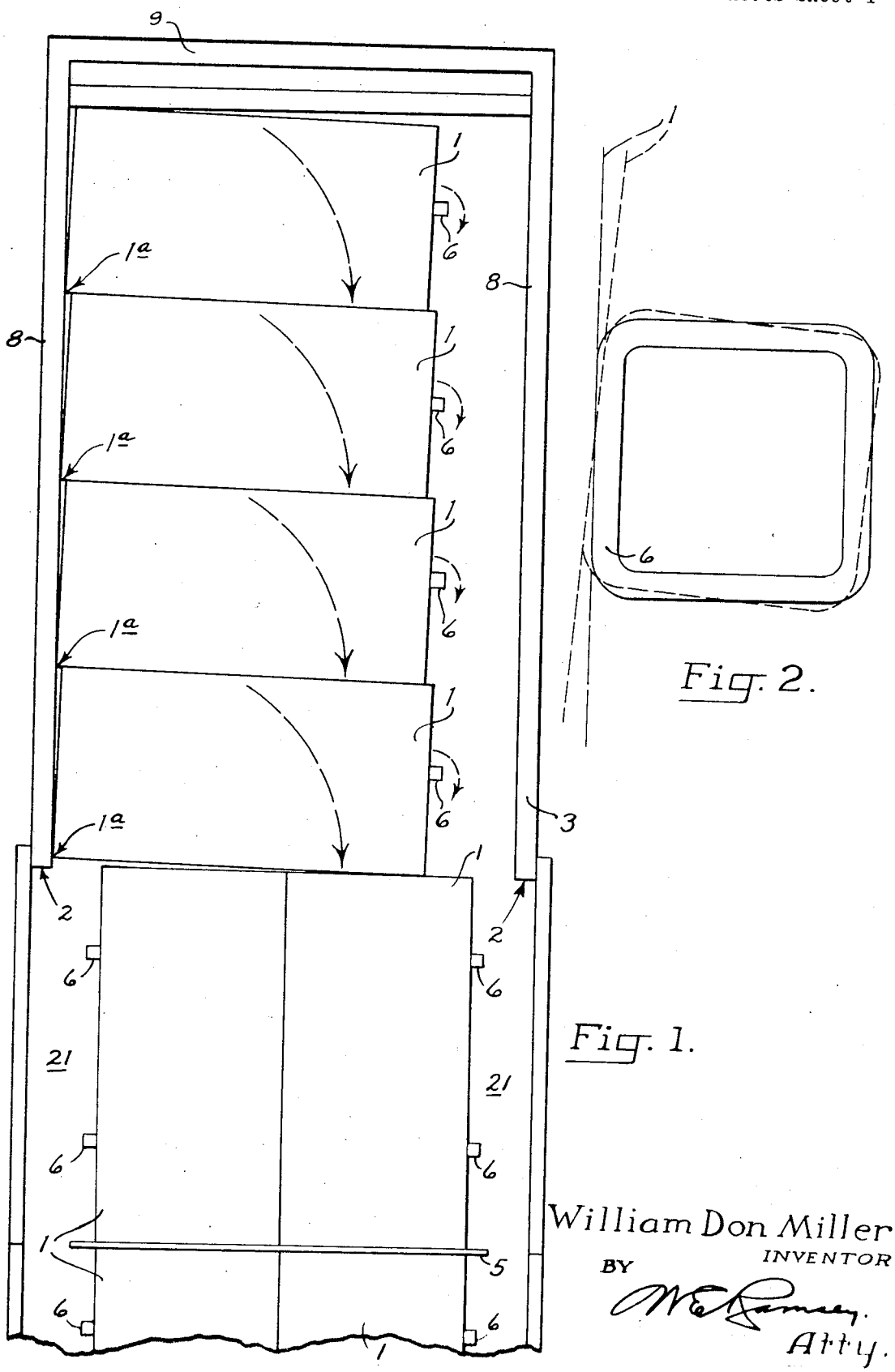
FIG. 1 is a schematic plan view looking downwardly on a railway boxcar with the roof of the boxcar shown removed, illustrating by arrows some of the forces exerted on the packaged cargo when the boxcar is in motion and the torque that is produced within the posts by the canting of the individual units of cargo.
FIG. 2 is a cross sectional view through a rectangular, tubular post, illustrating the rotational distortion of a post that produces torque within the elastic limit of the post under a few degrees of rotation.

First referring to FIG. 1:

As is shown in said drawing and as has been pointed out in my U.S. Pat. No. 3,342,142, forces generated in transit are caused primarliy from acceleration and deceleration of a railroad car, bumping and by sway. The forces that cause the most difficulty are those induced by acceleration and deceleration and by bumping. Bundled plywood and bundled lumber, as well as cargo strapped to pallets, are quite firm and rigid. The units are also generally uniform in size. My observation has been that the load cants or racks before it shifts by translation. FIG. 1 shows schematically how strapped bundles of plywood 1 tip on a corner 1ª, for example. Thus the entire bundle, being rigid, rocks clockwise, as indicated by arrows, swung upon a radius about said corner. In an ordinary boxcar, it is common to arrange four stacks of plywood, three high, at each side of the door openings 2 at opposite ends of a railroad car 3. These bundles are elongated and lie crosswise or laterally of a car at both ends thereof. The bundles that span the doorway are arranged with their major axes arranged lengthwise of a car.

The rack or cant of the several bundles pushes adjacent bundles domino-fashion until they strike the ends of bundles spanning the door openings. The bundles at the ends of the car tip so that they are no longer normal to the major axis of the railway car and they become wedged between their corners 1ª and a bracing post 6. If they were only temporarily tipped to this position and thereafter would be tipped in the opposite direction by an opposed force, the bundles would not be wedged tightly and would be damaged in transit.

The degree of tilt is exaggerated in the diagrammatic view in FIG. 2. Depending upon the rigidity of the package of cargo, the bundles will become wedged under compression and will be held tightly by friction to the ultimate degree of tip. Due to the wedging, it would take a substantially superior opposed force to release the wedging action in order to let them tip in the opposite direction. Railroad cars built in accordance with my U.S. Pat. No. 3,342,142 have had excellent experience in resisting cargo damage, and claims for damage have been substantially reduced.

Forces produced by pure vibration seemingly do not permit proper initial wedging action to take place, and thus this invention attempts to increase the wedging action, that is, the locking action incident to canting or racking, so that the cargo, once wedged, is not later relaxed in transit. When the cargo is to be discharged, the bundles may be righted and the stacks arranged plumb quite easily by the use of a lift truck. The operator of a lift truck runs the fork under a load an bumps it. This breaks the wedging bond and the play originally permitting the cargo to be loaded with little or no added bracing or dunnage is equally susceptible of ready discharge. The only point in the loading of a car such as is illustrated in FIG. 1 where a form of dunnage is desirable, is between the two stacks spanning the door openings. At this point, I preferably place a deckboard 5 of ½" or ¾" thick plywood vertically between the stacks. Such deckboard tends to prevent the domino effect from being transmitted through the load from end to end of the car and also tends to protect the corners 1ᵃ about which the bundles tip and become wedged.

Referring to FIGS. 3, 4, and 5:

Bracing posts 6 are preferably made of high tensile strength aluminum. They are tubular and preferably square in cross section. For plywood and lumber, and other similar cargoes carried by pallets, 4" x 4" posts are provided in which the walls of the posts are ⅜" thick, for example. Posts of this character of high tensile strength aluminum have a wall structure that is not easily deformed but yet has a high elastic limit.

The posts are preferably interchangeable, both as to location in the car and also end to end. The railway car has a floor 7 defining plural cargo spaces, as is shown in FIG. 1. It has two side walls 8, end walls 9, and a roof (not shown). Beneath the roof and spanning the floor is a horizontal bracing element 10, usually a part of the metal framework of a boxcar. It is usual to secure these frame member, constituting bracing elements, so as to be supported by the roof of the car as by pendant threaded rods 11 held in place by opposed nuts 12. Welded to the bracing element and forming a part thereof is a box-like structure 13, best shown in FIGS. 3 and 4. On the under side of said structure 14 are a pair of opposed flanged side plates 13ᵃ. The proximate edges 13ᵇ of the flanged sides 13ᵃ are spaced apart a distance corresponding to the dimension of the non-circular bracing posts 6. If 4 x 4 posts are provided, the spacing of these edges will be about 4¼, so that the bracing posts may be inserted between them with slightly more than a sliding fit, permitting the posts to be tipped slightly when they are to be mounted in place on loading and when they are removed at the end of the trip.

The box-like structure 13 constitutes an upper socket mount for a bracing post 6. Recessed in the floor is a lower socket mount having top 15ᵃ of slight thickness so that the bottom socket mounts will not constitute a substantial break in the floor line if the cars are used for general cargo, and without bracing posts. As is shown in FIG. 5, the said top has multiple pockets 16 spaced at modular distances transversely of a boxcar to accommodate the posts to the load being transported and braced. I show four pockets spaced apart on 2" modules. This will permit the posts to be varied 6" overall. The upper pocket mount 14 also is provided with the same number of pockets 17 and spaced in identical manner. This permits a post to be shifted and aligned between the two mounts and remain vertical in any pair of related pockets in the upper and lower pocket mounts. The lower socket mount 15 is preferably joined to the floor 7 of the boxcar by counter-sunk screws 15ᵇ. A selected post to be mounted, as is shown in FIG. 3, is first inserted with a knob-like terminal fitting 18 inserted in a selected pocket 17 in the upper socket mount 14. The socket mount has a free floating plate 20 in the box-like structure 13 and thus this plate may easily be lifted from the position it assumes in FIG. 3 and pushed into the box-like structure until the lower end of a bracing post 6 can be inserted in a related pocket in the lower socket mount and fixed so that it will assume a vertical position. The lower end of a bracing post also is provided with a knob-like fitting 19 that fits into a socket that has been selected. It is particularly desirable that the lower socket mounts be quite shallow so that none of the framework of a boxcar must be cut or otherwise weakened.

If the track over which the boxcar runs is quite rough, frequently the post tend to be bounced from the mounts and this is the purpose of the knob-like terminal fittings. If they are hanging pendant, the posts may be lifted quite readily, but if they are canted in any direction, the knob will not pass through the pocket 16 and inadvertent detachment is thus prevented. I prefer to use a knob-like terminal fitting of the from illustrated in FIG. 3. In section, it looks something like a frustum of a toy top rather than that of a sphere. The upper portion is slanted more horizontally than is a sphere, and the bottom portion is more tapered so that when the fitting enters a pocket, it will be guided centrally thereof and moved into mounted position more readily. This structure eliminates the need for springs for holding the posts in lowered position, as is illustrated in FIG. 3. To be effective, spring compression has to be high, and this makes the attachment and release of posts more difficult. Devoid of springs, the only thing that a workman must do is to lift the post and its terminal fittings and the weight of free-floating plate 20 lodged within the box-like structure 13.

This free-floating plate 20 preferably has four upstanding flanges 20ᵃ to prevent the plate from tipping. That is to say, as is shown in FIG. 4, the outer faces of said flanges have only a slight working clearance with the inside of the box portion of the structure 14. When the plate is manually pushed up by the post and later is lowered, the plate will tend to assume a position of rest in proper registration by reason of the close fit of the free-floating plate 20 and its flanges 20ᵃ within the box 13.

To accommodate the tipping of the posts during their insertion and removal, they are preferably arranged with one bracing post at the lateral median line of a bundle and at a point spaced substantially inwardly of the inner face of the wall, at one side of the boxcar. This provides two offset access ways 21, each running about half the length of a car from the door opening toward the adjacent end of a car. Each is of sufficient width to permit a workman to stand in an access way to lift a post and then to pull the lower end thereof into said access way, then lower it until the knob-like terminal fitting 18 at the upper end of a post is free of its pocket.

Spanning the two door openings presents a different problem because it is this area that is the last to be loaded and first to be unloaded. It is necessary that the cargo does not bear against the sliding doors. Thus I arrange the bracing post line at the right hand side of the car as viewed in FIG. 1, at a point about half the width of the access way 21. At the other end of the car an access way is provided at the left hand side (not shown). Two rows of posts are arranged at the aligned door openings, as is illustrated in the drawing, and the posts may be removed by swinging the lower ends thereof out through the doorways, respectively, at opposite sides of the railway car.

Other cargo, such as packaged goods, is supported by pallets that are usually substantially smaller than stacks of 4' by 8' plywood. These require that the post spacing be varied in order to engage the sides thereof, and to stabilize the load. Also in railroad cars of the all-door type, it is necessary to have posts at both sides spanning the entire length of the railroad car because of the necessity of keeping the doors free from being jammed. This post spacing, if the bundles of goods are elongated as are bundles of plywood, require the posts to be arranged at the median line of a pallet load of bundles and lateral line of a bundle at both ends of a pallet. As illustrated in FIG. 1, stacks of plywood are elongated and lie with their major dimension parallel to the major dimension of the boxcar.

Observation of the posts and the lading on arrival at the point of destination indicates that the resiliency of the posts permitting rotation of the bottom ends only causes a substantial locking effect that must have occurred early in the passage of the train from the point of delivery, because of the absence of damage to the cargo. The more or less uniform practice of using fork trucks provides ample power for butting and straightening the stacks, relaxing the torque set up in each post, and permits the posts to hang pendant from their upper mounts. Thereafter they easily may be removed, as has previously been described, and stacked in an access way so as to be out of the way while the cargo is being unloaded. I attribute this greater holding force on the cargo to the twisting imposed on the posts which causes the flat faces of the posts to remain in face-to-face relationship with the sides of the rectangular cargo units while they are twisted. If the post did not twist, that is, if both ends of a post were secured or both were journalled, it would cause scarring of the edges of the plywood or other material being carried with possible claims for damage in transit.

This wedging action produced by the posts is called cam-lock by the various men loading and unloading freight cars by the use of my invention.

The twisting of the post and the consequent torque induced in the posts while engaging the sides of the stacks of cargo holds them resiliently, which is something of additional consequence to the wedging action produced by non-rotatable posts. The reason that I prefer to journal the lower ends of the posts rather than the upper ends is that the lower ends are the ones that have to resist the greater forces. In loading boxcars with lumber or plywood, it is common to load them but three stacks high which is about three-fourths of the height of the interior of a boxcar.

I claim:

1. A load bracing assembly for an elongated railway freight car, having a floor, side and end walls, and having a fixed mounting element spaced above the floor;

the floor constituting plural cargo spaces, each space terminating, at least at one end thereof, a substantial distance from a sidewall of the railway freight car;

plural related pairs of aligned lower and upper socket mounts carried by the floor and horizontal mounting element, respectively, arranged at the median line of each cargo space bordering thereon;

non-circular, tubular, vertical bracing posts supported top and bottom in each related pair of socket mounts;

the lower end of each bracing post terminating in a journal knob, loosely and rotatably engaging its floor socket mount;

the upper end of each bracing post being axially slidable in its upper socket mount, said upper socket mount having a pocket formed therein complementary to the peripheral outline of the bracing post fitted therein, thus to inhibit substantial rotation of the post in said socket;

the walls of each non-circular tubular bracing post being elastic to yield, and to induce torque in the post if the latter is twisted and distorted by the shifting of the load being braced by said posts;

thereby arranging each cargo space to accommodate it to the cargo to be stowed therein so that said cargo can rack or cant to a limited degree within said space and thereby twist the bracing post to induce bias therein to hold the cargo wedged during transit, elastically, and also to be held frictionally against lateral and longitudinal displacement in said said cargo space.

2. The organization defined in claim 1, including an access way arranged at one end of each cargo space, extending lengthwise of the car and arranged immediately inwardly of a side wall, the socket mounts lying adjacent the inboard margin of said access way.

3. The organization defined in claim 1, including an access way arranged at one end of each cargo space, extending lengthwise of the car and arranged immediately inwardly of a side wall, the socket mounts lying adjacent the inboard margin of said access way, each socket mount of a related pair having plural pockets spaced at modular distances transversely of a boxcar to vary the effective width of the access way adjacent whose inboard margin the socket mounts are carried.

4. The organization defined in claim 1, including the upper socket mount constituting a box-like structure, having a free-floating guide element carried within said structure.

5. The organization defined in claim 1, including the upper socket mount constituting a box-like structure, having a free-floating guide element carried within said structure, and provided with upstanding marginal flanges slideable over the interior wall surface of the box-like structure to assure registration of the guide element with the upper end of the bracing post that engages therewith.

References Cited

UNITED STATES PATENTS

| | | | |
|---|---|---|---|
| 617,623 | 1/1899 | Young | 105—369 B |
| 1,665,439 | 4/1928 | Brown | 105—369 B |
| 2,336,869 | 12/1943 | Johnson | 105—369 B |
| 2,820,667 | 1/1958 | Benaroya et al. | 105—369 B |
| 3,342,142 | 9/1967 | Miller | 105—369 B |

DRAYTON E. HOFFMAN, Primary Examiner